United States Patent [19]

Chester

[11] 4,226,759

[45] Oct. 7, 1980

[54] FRICTION MATERIALS

[75] Inventor: John Chester, Stockport, England

[73] Assignee: Ferodo Limited, Manchester, England

[21] Appl. No.: 929,533

[22] Filed: Jul. 31, 1978

[30] Foreign Application Priority Data

Aug. 10, 1977 [GB] United Kingdom ............... 33485/77

[51] Int. Cl.$^2$ ............................................. C08K 3/08
[52] U.S. Cl. .................................... 260/38; 260/37 M
[58] Field of Search ............... 260/38, 37 M, DIG. 39

[56] References Cited

U.S. PATENT DOCUMENTS

| | | | |
|---|---|---|---|
| 3,835,118 | 9/1974 | Rhee et al. | 260/38 |
| 4,119,591 | 10/1978 | Aldrich | 260/38 |

Primary Examiner—Sandra M. Person
Attorney, Agent, or Firm—Cushman, Darby & Cushman

[57] ABSTRACT

Asbestos-free friction material compositions containing from about 20 to 45% by volume of the material of a thermoset binder of a phenol formaldehyde resin and optionally a heat and chemical reistant rubber, up to 10% by volume of an inert mineral filler and as the sole fibrous reinforcement 5 to 15% by volume of short lengths of steel fibers are disclosed. The compositions are useful as brake pads and the like and has properties comparable with asbestos-based materials.

11 Claims, No Drawings

FRICTION MATERIALS

BACKGROUND OF THE INVENTION

This invention relates to friction materials, and more particularly to friction materials of the kind used for brake pads, brake linings, clutch facings and similar uses.

Friction materials of this kind are generally composed of a thermoset binder, an inorganic fibrous reinforcement and various fillers and other additives. These compositions are required to withstand severe operating temperatures and pressures under repeated application without failure or deterioration in friction properties and the fibrous reinforcement generally used is asbestos. Numerous proposals have been made of compositions containing other inorganic fibrous reinforcement but such materials have so far had limited commercial acceptance.

DETAILED DESCRIPTION OF THE INVENTION

According to the present invention a friction material comprises a thermoset binder, a fibrous reinforcement, and other fillers and additives, the thermoset binder comprising a phenol-formaldehyde resin and making up 20 to 45 percent by volume of the material, the fibrous reinforcement consisting solely of short lengths of steel fibre in an amount between 5 and 15 percent by volume, and at least 10 percent by volume of the material comprising an inert mineral filler. By "inert mineral filler" in this specification we mean a particulate filler whose presence does not substantially affect the friction properties of the material and which is an inexpensive mineral such as barytes, whiting or silica. We exclude metal oxides from this class of fillers since they are used for other purposes in friction materials.

The inert mineral filler will generally be present in an amount between 10 and 35 percent by volume, and is most important from a cost point of view when comparing these materials with asbestos-based conventional materials, since asbestos is a cheap raw material being replaced by relatively expensive man-made fibre. Hence it is necessary to find a friction material having satisfactory properties but able to carry a loading of cheap filler material.

The fibrous reinforcement preferably consists of fine steel fibres having a length of the order of 1 to 5 mm and a diameter of the order of 0.125 mm. The steel may be a mild steel. The fibrous reinforcement preferably constitutes at least 9% by volume of the friction material.

The thermoset binder includes a thermoset resin based on a phenol-formaldehyde material but may also include a heat and chemical resistant vulcanized rubber, such as a nitrile rubber. Preferably a mixture of such materials is used in which the phenol-formaldehyde resin material is preferably the major constituent i.e. more than 50% of said mixture. When a rubber is used it may be incorporated into the friction material in the form of a solution in an organic solvent such as trichloroethylene, or in the form of a powder, and a vulcanizing agent such as sulphur can be also used.

It is usual in the manufacture of friction materials to include various other material as friction and wear modifiers the proportions of which can be varied to adjust to the friction and other properties of the materials.

Examples of friction and wear modifiers are carbon, graphite, antimony trisulphide and molybdenum disulphide and metals in a finely divided form. Examples of suitable metals are copper, brass and tin. A mixture of such materials may be used, and the total amount of such materials may be up to 40 percent by volume.

The friction materials of the present invention are particularly suited to be manufactured by a pressmoulding technique in which all the ingredients of the material are compounded together, the compounded mix disintegrated and (optionally) dried and then moulded into a component such as a brake pad in a die under pressure. The moulded component is then removed from the die and baked to cure the binder.

The invention provides friction materials which contain no asbestos and yet which have friction properties comparible to conventional asbestos-reinforced materials.

EXAMPLES OF THE INVENTION

The invention will now be illustrated by way of example only, by means of the following example.

EXAMPLE 1

Sample disc brake pads were made using the formulation given below in Table I. The ingredients were compounded together the nitrile rubber being introduced as a powder and the resulting dry mix was disintegrated and press-moulded in a die into the shape of discbrake pads. The mouldings so produced were baked in an oven to cure the binder.

TABLE I

| | | |
|---|---|---|
| Nitrile rubber | 12.07 | parts by volume |
| Sulphur | 3.18 | |
| Phenol-Formaldehyde Resin | 29.82 | |
| Steel Fibres | 10.00 | |
| Carbon Black | 5.71 | |
| Silica | 6.44 | |
| Barytes | 12.42 | |
| Graphite | 8.97 | |
| Antimony trisulphide | 2.53 | |
| Molybdenium disulphide | 1.90 | |
| Copper (Powdered) | 5.70 | |
| Tin (Powdered) | 1.26 | |

The sample disc-brake pads were tested and their friction properties found to be comparable to materials containing asbestos as the fibre reinforcement.

EXAMPLE 2

This example illustrates a formulation with a higher loading of steel fibres.

Disc brake pads were manufactured to the formulation given below in Table II by the same method as used in Example 1 except that the nitrile rubber in the present example was introduced as a 16% (by weight) solution in trichloroethylene.

TABLE II

| | | |
|---|---|---|
| Nitrile rubber | 12.07 | volumes(introduced in solution) |
| Sulphur | 3.18 | volumes(introduced in solution) |
| Phenol-formaldehyde resin | 29.82 | volumes(introduced in solution) |
| Steel fibres | 15.00 | volumes(introduced in solution) |
| Zircon | 1.00 | volumes(introduced in solution) |
| Barytes | 20.96 | volumes(introduced in solution) |
| Graphite | 8.97 | volumes(introduced in solution) |
| Antimony trisulphide | 2.00 | volumes(introduced in solution) |

TABLE II-continued

| | |
|---|---|
| Molybdenum disulphide | 1.00 volumes(introduced in solution) |
| Copper (powdered) | 4.50 volumes(introduced in solution) |
| Tin (powdered) | 1.50 volumes(introduced in solution) |

In tests, on a dynamometer, of the pads produced the coefficient of friction varied from 0.32 (cold) to 0.44 (hot) and wear was less than that of many conventional asbestos reinforced materials at this level of friction. The assembly shear strength of two pads was measured, the values obtained being 1410 and 1360 psi.

(Assembly shear strength =
$$\frac{\text{load required to shear material off the backplate}}{\text{area of friction material bonded to the backplate}}$$ )

EXAMPLE 3

This example illustrates the use of a lower binder content and higher loading of inert filler (Barytes). Disc brake pads were made by the same method as Example 2 to the formulation given in Table III.

TABLE III

| | |
|---|---|
| Nitrile rubber | 8.04 volumes(introduced in solution) |
| Sulphur | 3.18 volumes(introduced in solution) |
| Phenol-formaldehyde resin | 19.88 volumes(introduced in solution) |
| Steel fibre | 10.00 volumes(introduced in solution) |
| Carbon black | 13.97 volumes(introduced in solution) |
| Zircon | 1.00 volumes(introduced in solution) |
| Sillimanite | 2.50 volumes(introduced in solution) |
| Barytes | 25.96 volumes(introduced in solution) |
| Graphite | 8.97 volumes(introduced in solution) |
| Antimony trisulphide | 2.00 volumes(introduced in solution) |
| Copper (powdered) | 4.50 volumes(introduced in solution) |

The wear of these pads was similar to those of Example 2 and coefficient of friction varied from 0.27 (cold) to 0.48 (hot). The assembly shear strengths measured were 2210 and 1890 psi.

EXAMPLE 4

This example illustrates the use of an even lower binder content at the same loading of barytes. Disc brake pads were made as in Example 2 to the formulation given in Table IV.

TABLE IV

| | |
|---|---|
| Nitrile rubber | 6.03 volumes(introduced in solution) |
| Sulphur | 3.18 volumes(introduced in solution) |
| Phenol-formaldehyde resin | 14.91 volumes(introduced in solution) |
| Steel fibre | 10.00 volumes(introduced in solution) |
| Zircon | 1.00 Volumes(introduced in solution) |
| Sillimanite | 2.50 volumes(introduced in solution) |
| Barytes | 25.96 volumes(introduced in solution) |
| Graphite | 8.97 volumes(introduced in solution |
| Lead sulphide | 6.99 volumes(introduced in solution) |
| Coke (powdered) | 13.96 volumes(introduced in solution |
| Antimony trisulphide | 2.00 volumes(introduced in solution) |
| Copper (powdered | 4.50 volumes(introduced in solution) |

The wear of these pads was slightly higher than that of Examples 2 and 3 and the coefficient of friction varied from 0.30 (cold) to 0.40 (hot). The assembly shear strengths measured were 1360 and 1150 psi.

What I claim is:

1. A friction material composition suitable for moulded friction pads consisting essentially of a thermosetting binder, a fibrous reinforcement including additional fillers and additives, wherein:
   (a) the thermosetting binder comprises a phenol formaldehyde resin and a heat and chemical resistant rubber which binder constitutes from 20% to 45% by volume of the friction material composition of which at least half of said binder is said resin;
   (b) the fibrous reinforcement consists solely of short lengths of steel fiber in an amount between 5% and 15% by volume of the composition;
   (c) at least 10% by volume of the composition is an inert mineral filler; and
   (d) the balance of the composition consists substantially entirely of inorganic friction and wear modifiers in an amount up to 40% by volume.

2. A friction material according to claim 1 in which the fibrous reinforcement consists of fine steel fibres having a length of the order of 1 to 5 mm.

3. A friction material according to claim 1 in which the inert mineral filler is barytes, whiting or silica or a mixture thereof.

4. A friction material according to claim 1 or 3 in which the inert mineral filler makes up between 10 and 30% by volume of the friction material.

5. A friction material according to claim 1 in which the friction and wear modifiers are selected from carbon, graphite, antimony trisulphide, molybdenum disulphide and copper, brass and tin in finely divided form.

6. A friction material composition suitable for moulded friction pads which consists essentially of a thermosetting binder, a fibrous reinforcement and other fillers and additives wherein:
   (a) the thermosetting binder comprises a phenol formaldehyde resin and makes up 20% to 45% by volume of the friction material composition of which at least half of said binder is said resin;
   (b) the fibrous reinforcement consists solely of short lengths of steel fiber in an amount between 5% and 15% by volume of the composition;
   (c) 10% to 35% by volume of the composition is an inert mineral filler, not being a metal oxide; and
   (d) the balance of the composition being friction and wear modifiers in an amount up to 40% by volume of the composition provided that no more than 7% of said friction and wear modifiers is metal.

7. A friction material according to claim 6 in which the fibrous reinforcement consists of fine steel fiber having a length of the order of 1 to 5 mm.

8. A friction material according to claim 6 in which the inert mineral filler is barytes, whiting or silica or a mixture thereof.

9. A friction material according to claim 6 in which the friction and wear modifiers are selected from carbon, graphite, antimony trisulphide, molybdenum disulphide and copper, brass and tin in finely divided form.

10. A friction material according to claim 6 in which the thermoset binder comprises also a heat and chemical resistant vulcanised rubber.

11. A friction material according to claim 6 in which said rubber is a nitrile rubber.

* * * * *